(12) United States Patent
Holland et al.

(10) Patent No.: US 11,739,713 B2
(45) Date of Patent: Aug. 29, 2023

(54) FLUOROELASTOMER EROSION COATING REPAIR

(71) Applicant: Raytheon Technologies Corporation, Farmington, CT (US)

(72) Inventors: Brian Kenneth Holland, Mason, MI (US); Jonathan Roobol, Howell, MI (US); William Bogue, Hebron, CT (US); Kerry Lynn Davis, Middletown, CT (US); Michael A. Morden, Holt, MI (US); Brandon A. Gates, DeWitt, MI (US)

(73) Assignee: RAYTHEON TECHNOLOGIES COPORATION, Farmington, CT (US)

(*) Notice: Subject to any disclaimer, the term of this patent is extended or adjusted under 35 U.S.C. 154(b) by 0 days.

(21) Appl. No.: 17/854,515

(22) Filed: Jun. 30, 2022

(65) Prior Publication Data
US 2022/0333551 A1 Oct. 20, 2022

Related U.S. Application Data

(62) Division of application No. 17/231,673, filed on Apr. 15, 2021, now Pat. No. 11,408,371.

(51) Int. Cl.
B29C 73/10 (2006.01)
B23P 6/00 (2006.01)
F02K 1/82 (2006.01)

(52) U.S. Cl.
CPC ................... F02K 1/82 (2013.01); B23P 6/00 (2013.01); B29C 73/10 (2013.01); F05D 2230/23 (2013.01); F05D 2230/80 (2013.01)

(58) Field of Classification Search
CPC ........ B23P 6/00; B23P 6/002; F05D 2230/72; F05D 2230/80; F05D 2230/90; B29C 73/10
See application file for complete search history.

(56) References Cited

U.S. PATENT DOCUMENTS

| 7,419,556 B2 | 9/2008 | Holland |
| 10,352,236 B2 | 7/2019 | Kling et al. |
| 11,408,371 B1* | 8/2022 | Holland ............... F02C 7/04 |
| 2007/0079920 A1 | 4/2007 | Holland |

FOREIGN PATENT DOCUMENTS

WO 9601288 A2 1/1996

OTHER PUBLICATIONS

Extended European Search Report for EP Application No. 22165034.4, dated Sep. 28, 2022, pp. 1-8.

* cited by examiner

Primary Examiner — Christopher J Besler
(74) Attorney, Agent, or Firm — Cantor Colburn LLP

(57) ABSTRACT

Disclosed is a method of repairing a rear cone segment erosion coating including removing a portion of an existing fluoroelastomer coating from a rear cone segment to form a repair area; forming a cured replacement erosion coating corresponding to the repair area, wherein the cured replacement erosion coating has a layer of fluoroelastomer and a layer of fibrous reinforcement; preparing the repair area and the cured replacement erosion coating for adhesion; locating the prepared cured replacement erosion coating on the prepared repair area; and adhering the prepared cured replacement erosion coating to the prepared repair area. Also disclosed is a cured replacement erosion coating and a repaired inlet nose cone.

11 Claims, 4 Drawing Sheets

FLUOROELASTOMER EROSION COATING REPAIR

CROSS-REFERENCE TO RELATED APPLICATIONS

This application is a division of U.S. application Ser. No. 17/231,673 filed Apr. 15, 2021, the disclosure of which is incorporated herein by reference in its entirety.

BACKGROUND

Exemplary embodiments pertain to the art of erosion coating repair.

Jet engines are expected to operate under a wide variety of environmental conditions. Often, the components of jet engines are exposed to particulate matter which impinge upon the components and cause them to deteriorate. For example, sand, debris and other particulate matter are ingested by jet engines as planes travel along taxiways and runways. Still further, jet engines encounter airborne sand, rain and particulate matter such as volcanic ash during the normal course of the airborne operations. Since the sand and other particulate matter are impinging against components of the jet engine while traveling at relatively high speeds, these particulates often cause a great deal of erosion damage over time.

Fluoroelastomer erosion coatings have been developed to protect engine components such as inlet cones. While these coatings have provided excellent erosion protection there is a need for a method to repair and/or replace them to extend the useful life of these components.

BRIEF DESCRIPTION

Disclosed is a method of repairing a rear cone segment erosion coating including removing a portion of an existing fluoroelastomer coating from a rear cone segment to form a repair area; forming a cured replacement erosion coating corresponding to the repair area, wherein the cured replacement erosion coating has a layer of fluoroelastomer and a layer of fibrous reinforcement; preparing the repair area and the cured replacement erosion coating for adhesion; locating the prepared cured replacement erosion coating on the prepared repair area; and adhering the prepared cured replacement erosion coating to the prepared repair area.

In addition to one or more of the features described above, or as an alternative to any of the foregoing embodiments, removing the existing fluoroelastomer coating includes mechanical methods such as cutting, abrasive wiping, abrasive blasting, water jetting, or a combination thereof. Chemical softening of the existing fluoroelastomer coating may precede a mechanical method of removal.

In addition to one or more of the features described above, or as an alternative to any of the foregoing embodiments, forming the cured replacement erosion coating includes providing a mold with a concave surface corresponding to the repair area; attaching an end of a barrier film to the concave mold surface wherein the barrier film has a first surface and a second surface and a free end; placing a sheet of uncured fluoroelastomer on the mold surface wherein a first end of the uncured fluoroelastomer sheet is adjacent to the first surface of the barrier film, a second end of the uncured fluoroelastomer sheet is adjacent to a second surface of the barrier film, and the free end of the barrier film extends past the first end of the sheet of uncured fluoroelastomer; placing a sheet of fibrous reinforcement having a first end and a second end on the sheet of uncured fluoroelastomer such that a joint between the first end and second end of the fibrous reinforcement does not align with a joint between the first and second ends of the uncured fluoroelastomer and the barrier film is located between the ends of the sheet of the fibrous reinforcement; and curing the sheet of uncured fluoroelastomer.

In addition to one or more of the features described above, or as an alternative to any of the foregoing embodiments, forming the cured replacement erosion coating includes providing a mold with a convex surface corresponding to the repair area; attaching an end of a barrier film to the convex mold surface wherein the barrier film has a first surface and a second surface and a free end; placing a sheet of fibrous reinforcement on the mold surface wherein a first end of the fibrous reinforcement sheet is adjacent to the first surface of the barrier film, a second end of the fibrous reinforcement sheet is adjacent to a second surface of the barrier film, and the free end of the barrier film extends past the first end of the sheet of fibrous reinforcement; placing a sheet of uncured fluoroelastomer having a first end and a second end on the sheet of fibrous reinforcement such that a joint between the first end and second end of the uncured fluoroelastomer does not align with a joint between the first and second ends of the fibrous reinforcement and the barrier film is located between the ends of the sheet of the uncured fluoroelastomer; and curing the sheet of uncured fluoroelastomer.

In addition to one or more of the features described above, or as an alternative to any of the foregoing embodiments, the fibrous reinforcement includes a fiber and a polymer.

In addition to one or more of the features described above, or as an alternative to any of the foregoing embodiments, forming a cured replacement erosion coating comprises curing the combination of fluoroelastomer and fibrous reinforcement at a temperature of 300-400° F. and a pressure greater than or equal to 20 pounds per square inch (psi).

In addition to one or more of the features described above, or as an alternative to any of the foregoing embodiments, forming a cured replacement erosion coating comprises curing the combination of fluoroelastomer and fibrous reinforcement at a temperature of 300-400° F. in a vacuum bag.

In addition to one or more of the features described above, or as an alternative to any of the foregoing embodiments, locating the prepared cured replacement erosion coating on the prepared repair area comprises wrapping the prepared cured replacement erosion coating around the rear cone segment in a direction opposite to a direction of rotation.

In addition to one or more of the features described above, or as an alternative to any of the foregoing embodiments, adhering the prepared cured replacement erosion coating to the prepared repair area comprises curing an adhesive at a temperature less than 300° F.

In addition to one or more of the features described above, or as an alternative to any of the foregoing embodiments, a gap between the adhered cured replacement erosion coating and the existing fluoroelastomer coating is filled with a second fluoroelastomer.

In addition to one or more of the features described above, or as an alternative to any of the foregoing embodiments, the rear cone segment includes a front attachment flange and the repair area includes the front attachment flange.

In addition to one or more of the features described above, or as an alternative to any of the foregoing embodiments, the cured replacement erosion coating is darted in the front attachment flange area prior to cure.

Also disclosed is a cured replacement erosion coating for a rear cone segment comprising a layer of fibrous reinforcement adjacent to a layer of fluoroelastomer.

In addition to one or more of the features described above, or as an alternative to any of the foregoing embodiments, the layer of fibrous reinforcement has ends and the layer of fluoroelastomer has ends and the ends of fibrous reinforcement do not align with the end of the layer of fluoroelastomer.

In addition to one or more of the features described above, or as an alternative to any of the foregoing embodiments, the replacement erosion coating is darted in a forward flange area prior to curing the fluoroelastomer.

Also disclosed is a repaired inlet nose cone having a repaired section of erosion coating comprising a fluoroelastomer layer and a fibrous reinforcement layer and an original section of erosion coating comprising a fluoroelastomer layer.

In addition to one or more of the features described above, or as an alternative to any of the foregoing embodiments, the original section of erosion coating consists of a fluoroelastomer layer.

In addition to one or more of the features described above, or as an alternative to any of the foregoing embodiments, the fibrous reinforcement layer is not in contact with the original section of erosion coating.

In addition to one or more of the features described above, or as an alternative to any of the foregoing embodiments, the repaired section includes darting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
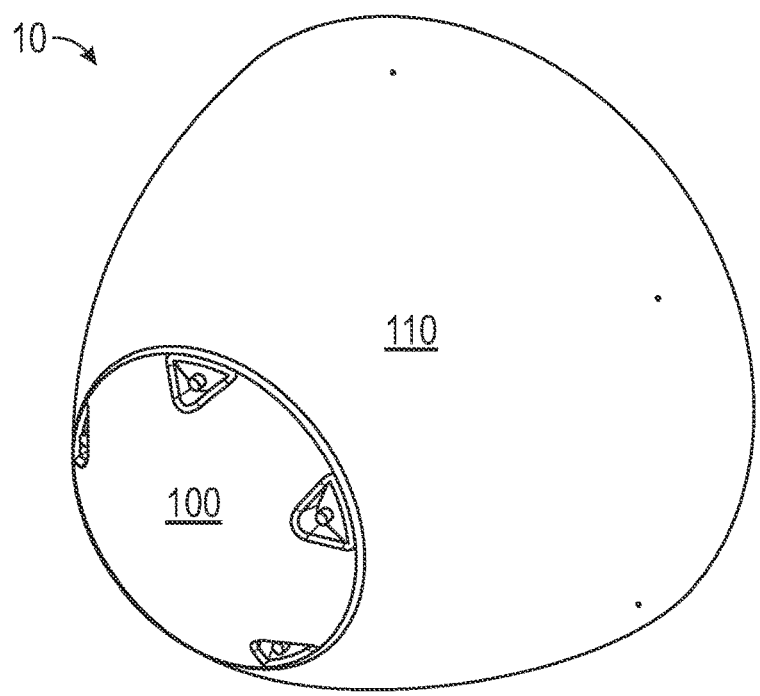
FIG. 1 shows an inlet cone for a gas turbine engine.
Figure 4:
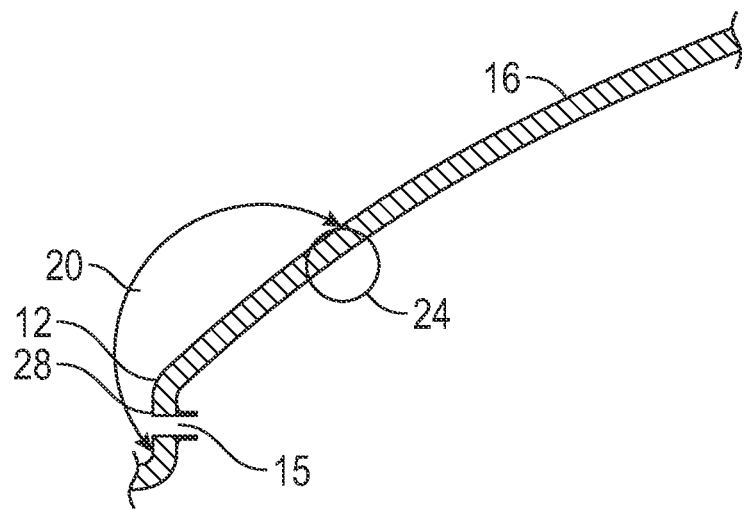
FIG. 4 shows a cross section of a repair area.

FIG. 1 shows an inlet cone for a gas turbine engine. The inlet cone 10 includes a forward cover 100 and a rear cone segment 110, both of which typically rotate with the fan, but may also be static in the airflow. The rear cone segment 110 is a truncated cone, with attachment flanges on the forward and aft extents. The forward flange (also referred to as the front attachment flange) is shown in FIG. 4 and is protected by the forward cover 100. The aft flange is not shown.

Figure 2:
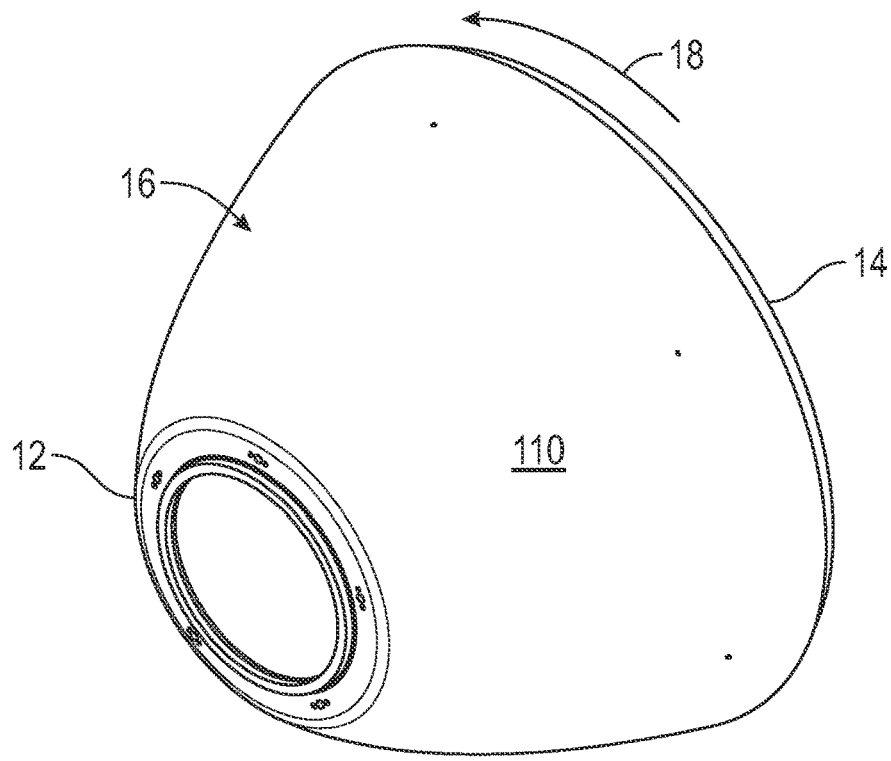
FIG. 2 shows a rear cone segment.

FIG. 2 shows rear cone segment 110 for a gas turbine engine. The rear cone segment 110 is rotatably mounted to the turbine engine in front of the fan blades and has a leading edge 12, a trailing edge 14, and an outer flow surface 16. The rear cone segment 110 has a direction of rotation 18.

Figure 3:
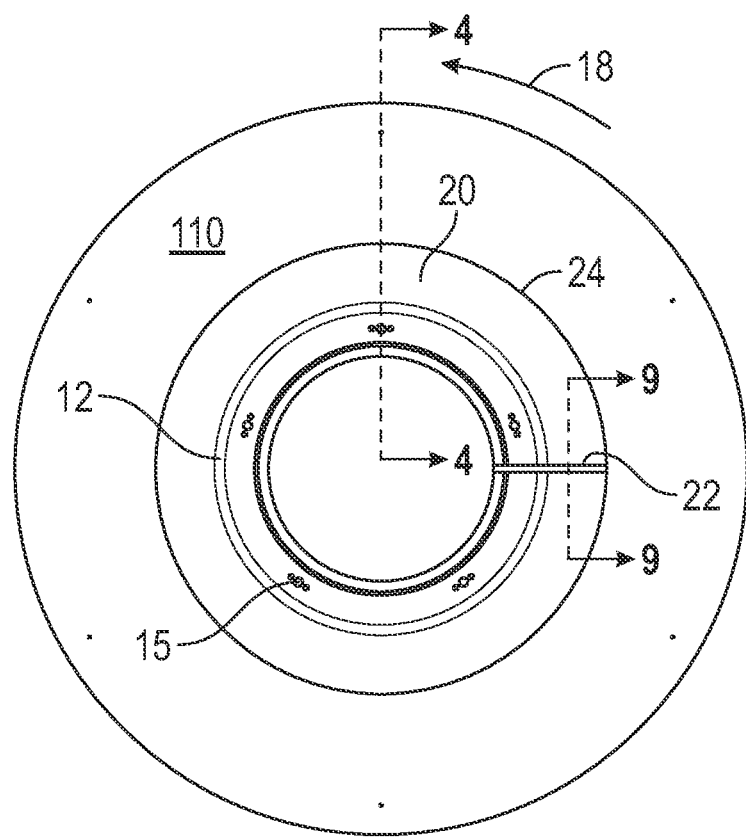
FIG. 3 is a front view of a rear cone segment.

FIG. 3 is a front view of rear cone segment 110. The rear cone segment 110 has attachment holes 15 for forward cover 100. Repair area 20 includes the attachment holes and a portion of the outer flow surface 16. Repair area 20 has an axial joint 22 and a circumferential joint 24. FIG. 2 also shows section line 4 and section line 9 which are shown in greater detail in FIG. 4 and FIG. 9 respectively.

FIG. 4 shows a cross section of repair area 20 having a leading edge 12 and a forward flange 28. Forward flange 28 includes the attachment holes 15. Because the repair area includes the forward flange, airflow is prevented from getting under the forward edge of the repair material. An additional feature of having the repair area cover the forward flange is the mating part has a bolted interface that passes through the repair material, thus further securing the repair detail. The circumferential joint 24 is shown in greater detail in FIG. 10.

The existing fluoroelastomer coating is removed from the rear cone segment 110 to form repair area 20. The existing fluoroelastomer coating may be removed by mechanically by cutting it away with a blade, abrasive wiping, abrasive blasting, water jetting, or a combination thereof. Chemical softening of the existing fluoroelastomer coating may precede mechanical removal. Chemical softening includes contact with a solvent such as acetone, methyl ethyl ketone, or another solvent comprising a ketone. After the existing fluoroelastomer coating is removed the repair area may be cleaned, inspected, and prepared for bonding with the cured replacement erosion coating.

The cured replacement erosion coating is formed to correspond to the repair area. The cured replacement erosion coating may be formed using a concave mold or a convex mold. The shape of the mold, concave or convex, alters the order in which the layers of material are assembled in order to form the cured replacement erosion coating. The layers of material may be assembled to form an overlapping joint where the different layers begin/end at different locations or the layers of material may be assembled to begin/end at the same location.

When using a mold with a concave surface, one end of a barrier film is applied to the mold surface. A sheet of uncured fluoroelastomer having a first end, a second end, a front edge and a back edge is used. The sheet of uncured fluoroelastomer is wrapped axially so the first end and second end are located axially and the front edge and back edge are located circumferentially. The sheet of uncured fluoroelastomer is placed on the mold surface so that the first end of the fluoroelastomer sheet is adjacent to one side of the barrier film and the second end of the fluoroelastomer sheet is adjacent to the other side of the barrier film. The free end of the barrier film extends beyond both ends of the fluoroelastomer sheet. A sheet of fibrous reinforcement is placed on the uncured elastomer so that the joint between the ends of the fibrous reinforcement do not align with the joint between the ends of the uncured elastomer. The barrier film is located between the ends of the uncured fluoroelastomer and between the ends of the fibrous reinforcement.

Figure 5:
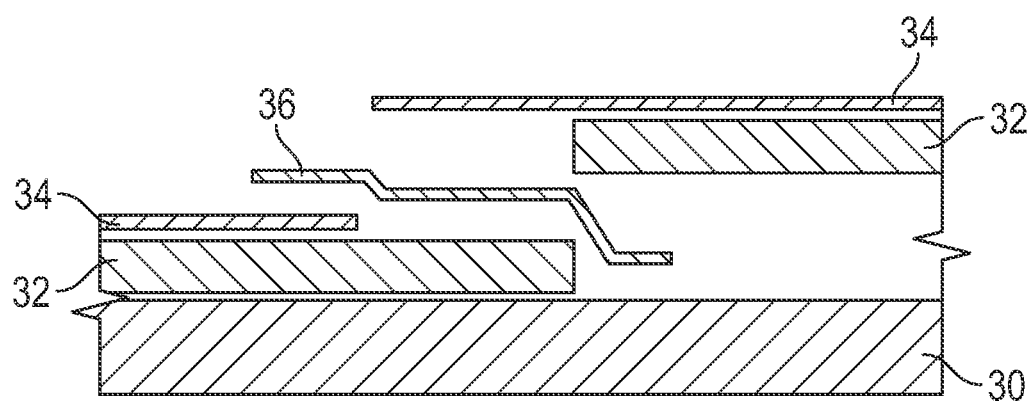
FIGS. 5 and 6 show a layup of an uncured replacement erosion coating.

FIG. 5 shows a mold having a concave surface 30, an uncured fluoroelastomer sheet 32 disposed on the mold with a first end of the uncured fluoroelastomer sheet located adjacent to one side of barrier film 36 and the second end of the uncured fluoroelastomer sheet 32 located next to the opposite side of barrier film 36. The fibrous reinforcement 34 is disposed on the uncured fluoroelastomer sheet with one end adjacent to one side of barrier film 36 and the other end of the fibrous reinforcement 34 located next to the opposite side of barrier film 36. The joint formed by the ends of the uncured fluoroelastomer sheet does not align with the joint formed by the ends of the fibrous reinforcement 34.

Figure 6:
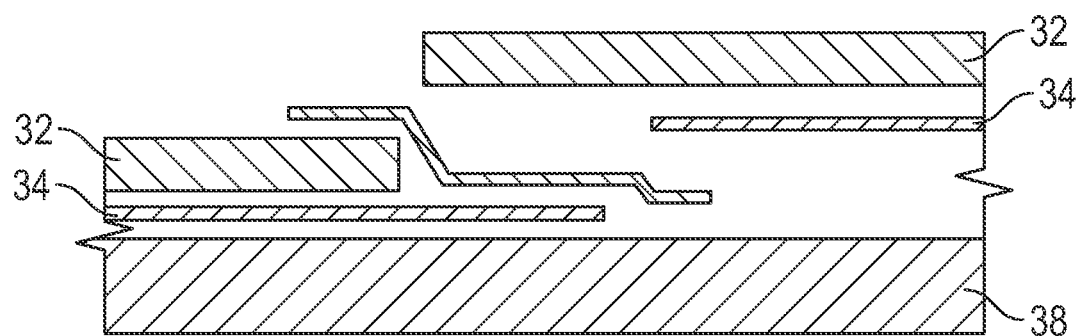

When using a mold with a convex surface the order of the uncured fluoroelastomer and fibrous reinforcement are reversed. FIG. 6 shows a mold having a convex surface 38, a fibrous reinforcement 34 disposed on the mold with a first end of the fibrous reinforcement 34 located adjacent to one side of barrier film 36 and the second end of the fibrous reinforcement 34 located next to the opposite side of barrier film 36. The uncured fluoroelastomer sheet 32 is disposed on the fibrous reinforcement 34 with a first end adjacent to one side of barrier film 36 and the second end of the uncured fluoroelastomer sheet 32 located next to the opposite side of barrier film 36. The joint formed by the ends of the uncured fluoroelastomer sheet 32 does not align with the joint formed by the ends of the fibrous reinforcement 34.

In some embodiments one end of the uncured fluoroelastomer and one end of the fibrous reinforcement are aligned and are modified later such that the joint between the two ends of the fluoroelastomer does not align with the joint between the two ends of the fibrous reinforcement.

Exemplary fibrous reinforcements include fiberglass, polyamide fiber, carbon fiber, and the like. The fibrous reinforcement may be fiberglass or fiberglass with an impregnated polymer. The fibrous reinforcement is in sheet form and may be woven or non-woven. The fibrous reinforcement may include an impregnated polymer. Exemplary polymers include, but are not limited to: epoxy, polyester, bismaleimide, phenolic.

While the fibrous reinforcement and the fluoroelastomer have been described as a single sheet it is possible use multiple pieces with sufficient overlap, typically greater than or equal to 0.125 inch of overlap. The maximum gap between the pieces of fibrous reinforcement is 0.125 inch. The fibrous reinforcement and the fluoroelastomer may be darted—either by overlap or by segmenting—to accommodate changes in the circumference of the rear cone segment.

The uncured assembly (mold, fluoroelastomer, fibrous reinforcement, and barrier film) is exposed to appropriate conditions to cure the uncured fluoroelastomer sheet and optionally any polymer impregnating the fibrous reinforcement. Typical conditions include temperatures of 300-400° F. and typical pressures of 20-60 psi for 1 to 3 hours. Cure may also be performed with a vacuum bag with a vacuum pressure as low as 11 psi (22 inches of Hg). During curing the fluoroelastomer may flow into the fibrous reinforcement. The cured assembly is removed from the mold and the barrier film is removed from the cured assembly to result in the cured replacement erosion coating. The fluoroelastomer is cured prior to being applied to the rear cone segment because if the material is cured directly onto the part, delamination in the original erosion coating is likely. Direct curing can also result in surface defects in the fluoroelastomer material.

The cured replacement erosion coating has a bond surface and an outer flow surface opposite to the bond surface. The bond surface may be prepared for bonding by mechanical abrasion, chemical cleaning, plasma etch, or a combination thereof. Optionally, the cured replacement erosion coating may be trimmed to fit the repair area.

Figure 7:
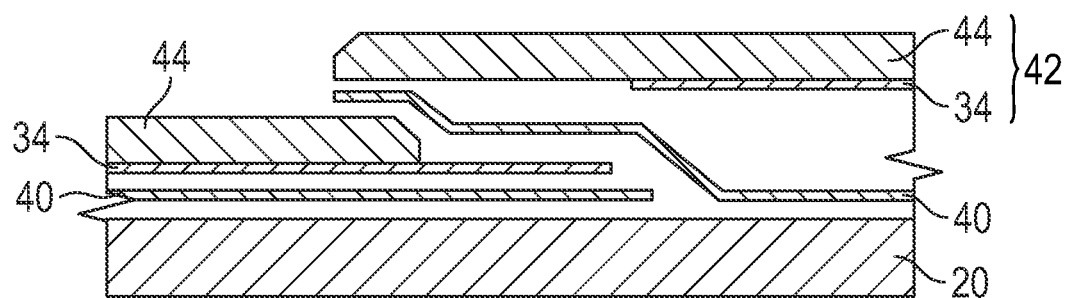
FIGS. 7 and 8 show a cured replacement erosion coating located on a repair area.
Figure 8:
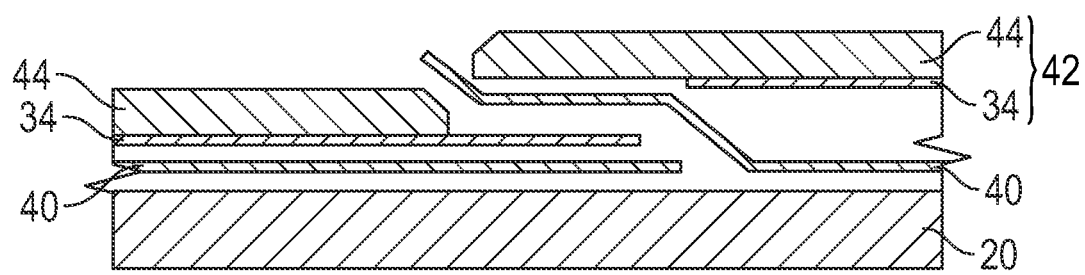

FIGS. 7 and 8 show the cured replacement erosion coating 42 located on the repair area 20. Adhesive 40 is located between the cured erosion coating and the repair area to bond the cured replacement erosion coating 42 to the repair area 20. Cured replacement erosion coating 42 includes fibrous reinforcement 34 and cured fluoroelastomer 44. FIG. 7 shows the ends of cured fluoroelastomer 44 overlapping.

The overlapping fluoroelastomer can be removed after the adhesive 40 has bonded the cured replacement erosion coating to the repair area. FIG. 8 shows the ends of cured fluoroelastomer 44 meeting without overlap.

The adhesive used to adhere the cured replacement coating to the repair area has a cure temperature less than that of the fluoroelastomer used in the cured replacement coating. For example, the adhesive may have a cure temperature less than or equal to 300° F.

The cured replacement erosion coating may be abraded and blended to have a continuous surface with the original erosion coating. Any gaps between the cured replacement erosion coating and the original erosion coating can be filled with a liquid fluoroelastomer which is then cured.

Figure 9:
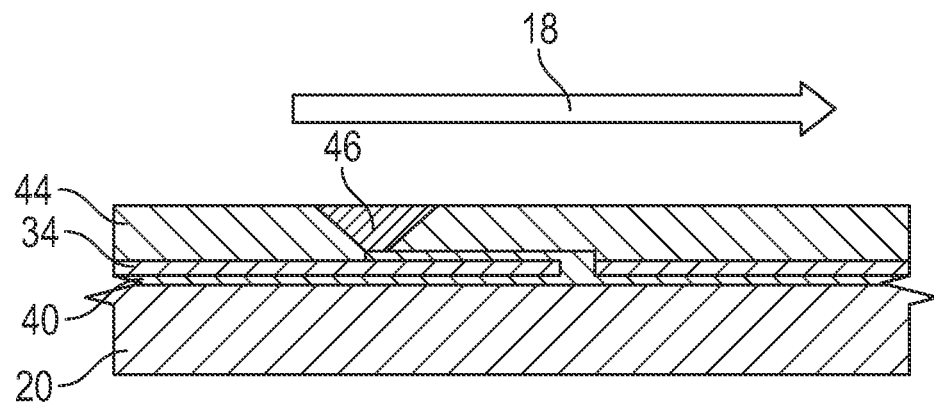
FIG. 9 shows a finished axial joint of the cured replacement erosion coating.

FIG. 9 shows the finished axial joint. The joint between the ends of the cured fluoroelastomer 44 is sanded smooth and any excess adhesive is removed and liquid fluoroelastomer 46 is used to smooth and fill the gap where adhesive was removed. The liquid fluoroelastomer 46 is cured at a temperature less than the cure temperature of the adhesive. As can be seen from FIG. 9, the prepared cured replacement erosion coating is located on the prepared repair area by wrapping the prepared cured replacement erosion coating around the rear cone segment 110 in a direction opposite to a direction of rotation.

Figure 10:
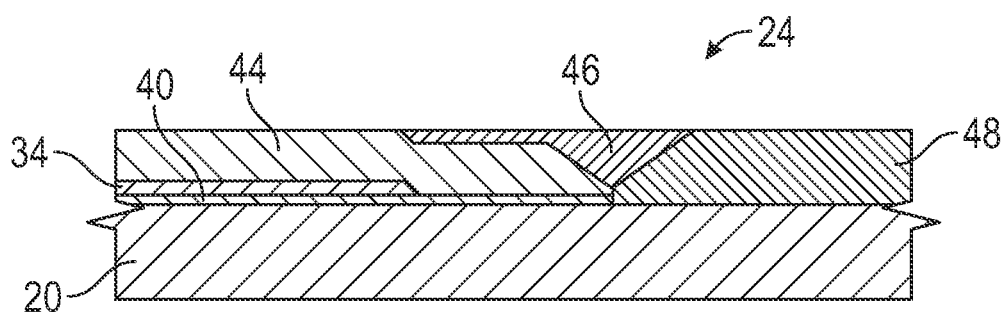
FIG. 10 shows the finished circumferential joint.

FIG. 10 shows the finished circumferential joint 24. The cured fluoroelastomer 44 may overlap the original erosion coating when first located on the repair area. In the finished circumferential joint the cured fluoroelastomer may be sanded smooth and any excess adhesive is removed and any gap between the newly applied cured fluoroelastomer and the original erosion coating filled with second fluoroelastomer 46, typically a liquid fluoroelastomer, is which cured. A gap may be the result of bonding tolerances or from removal of excess adhesive. The fibrous reinforcement does not contact the original erosion coating. The original erosion coating may consist of a fluoroelastomer.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of repairing a rear cone segment erosion coating comprising:
   removing a portion of an existing fluoroelastomer erosion coating from the rear cone segment to form a repair area;
   forming a cured replacement erosion coating corresponding to the repair area, wherein the cured replacement erosion coating has a layer of fluoroelastomer and a layer of fibrous reinforcement;
   preparing the repair area and the cured replacement erosion coating for adhesion;
   locating the prepared cured replacement erosion coating on the prepared repair area; and
   adhering the prepared cured replacement erosion coating to the prepared repair area;
   wherein forming the cured replacement erosion coating comprises:
   providing a mold with a concave surface corresponding to the repair area;
   attaching a first end of a barrier film to the concave mold surface wherein the barrier film has a first surface and a second surface and a free second end;
   placing an uncured sheet of the fluoroelastomer on the mold surface wherein a first end of the uncured sheet of the fluoroelastomer is adjacent to the first surface of the barrier film, a second end of the uncured sheet of the fluoroelastomer is adjacent to the second surface of the barrier film, and the free second end of the barrier film extends past the first end of the uncured sheet of the fluoroelastomer;
   placing a sheet of the fibrous reinforcement having a first end and a second end on the uncured sheet of the fluoroelastomer such that a joint between the first end and second end of the sheet of the fibrous reinforcement does not align with a joint between the first and second ends of the uncured sheet of the fluoroelastomer and the barrier film is located between the ends of the sheet of the fibrous reinforcement; and
   curing the uncured sheet of the fluoroelastomer.

2. The method of claim 1, wherein removing the existing fluoroelastomer coating comprises mechanically removing the existing fluoroelastomer coating by cutting, abrasive wiping, abrasive blasting, water jetting, or a combination thereof.

3. The method of claim 2, wherein removing the existing fluoroelastomer coating further comprises chemical softening of the existing fluoroelastomer coating prior to mechanically removing the existing fluoroelastomer coating.

4. The method of claim 1, wherein the fibrous reinforcement comprises a fiber and a polymer.

5. The method of claim 1, wherein forming the cured replacement erosion coating comprises curing a combination of the layer of fluoroelastomer and the layer of fibrous reinforcement at a temperature of 300-400° F. and pressure greater than or equal to 20 psi.

6. The method of claim 1, wherein forming the cured replacement erosion coating comprises curing a combination of the layer of fluoroelastomer and the layer of fibrous reinforcement at a temperature of 300-400° F. in a vacuum bag.

7. The method of claim 1, wherein locating the prepared cured replacement erosion coating on the prepared repair area comprises wrapping the prepared cured replacement erosion coating around the rear cone segment in a direction opposite to a direction of rotation.

8. The method of claim 1, wherein adhering the prepared cured replacement erosion coating to the prepared repair area comprises curing an adhesive at a temperature less than 300° F.

9. The method of claim 1, wherein a gap between the adhered cured replacement erosion coating and the existing fluoroelastomer coating is filled with a second fluoroelastomer.

10. The method of claim 1, wherein the rear cone segment includes a front attachment flange and the repair area includes the front attachment flange.

11. The method of claim 10, wherein the cured replacement erosion coating is darted in a front attachment flange area prior to the cure.

* * * * *